United States Patent [19]
Byun et al.

[11] Patent Number: 6,026,057
[45] Date of Patent: Feb. 15, 2000

[54] METHOD AND SYSTEM FOR CORRECTING FOR OFFSET-DEPENDENT DIRECTIVITY EFFECTS IN SEISMIC SURVEY SIGNALS

[75] Inventors: Bok S. Byun, Plano; E. Stuart Nelan; Chi Young, both of Dallas, all of Tex.

[73] Assignee: Atlantic Richfield Company, Los Angeles, Calif.

[21] Appl. No.: 09/090,432

[22] Filed: Jun. 4, 1998

[51] Int. Cl.$^7$ ........................................ G01V 1/36
[52] U.S. Cl. ................................. 367/52; 367/47
[58] Field of Search .................. 367/21, 52, 47, 367/59, 83

[56] References Cited

U.S. PATENT DOCUMENTS

| | | | |
|---|---|---|---|
| 5,661,697 | 8/1997 | Swan et al. | 367/47 |
| 5,684,754 | 11/1997 | Byun et al. | 367/52 |

OTHER PUBLICATIONS

Aki and Richards, *Quantitative Seismology—Theory and Methods*, vol. I (Freeman, 1980), pp. 123–192.

Taner, et al., "Velocity Spectra—Digital Computer Derivation and Applications of Velocity Functions", *Geophysics*, vol. 34, No. 6 (1969), pp. 859–881.

Dix, "Seismic Velocities from Surface Measurements", *Geophysics*, vol. XX, No. 1, (1955), pp. 68–86.

Berg, et al., "SUMIC: Multicomponent sea–bottom seismic surveying in the North Sea—Data interpretation and applications", *Expanded Abstracts with Biographies, 1994 Technical Program of the SEG Int'l Exposition and 64$^{th}$ Annual Meeting* (1994) pp. 477–480.

Kendall, et al., "Noise Analysis Using a Multicomponent Surface Seismic Test Spread", *Expanded Abstracts with Biographies, 1993 Technical Program of the SEC Int'l Exposition and 63$^{rd}$ Annual Meeting* (1993), pp. 566–568.

*Primary Examiner*—Christine K. Oda
*Assistant Examiner*—Anthony Jolly
*Attorney, Agent, or Firm*—Anderson, Levine & Lintel

[57] ABSTRACT

A method and computer system for correcting seismic signals in a seismic survey, sensed in horizontal and vertical directions at receiver locations, is disclosed. According to the disclosed method and system, the horizontal and vertical seismic signal traces are processed in prestack gathers, after normal move-out correction. For each reflection event indicated in the prestack gathers, a performance function is evaluated over a range of zero-offset directivity and directivity slope values, using the horizontal and vertical pressure wave components sensed at the receivers. The zero-offset directivity and directivity slope values that return the maximum performance function are stored in connection with the gather and the reflection event, as indicative of the zero-offset dip and offset-dependent directivity of the reflective surface corresponding to the reflected event. These zero-offset directivity and directivity slope values are then used to correct the traces, or generate a new trace, corresponding to the pressure wave signal that is in the true reflected wave ray direction, minimizing the component of the sensed pressure wave that is transverse to the longitudinal wave ray direction. Detection and analysis of pressure-to-shear wave conversion, as well as amplitude-versus-offset analysis, is then facilitated by the present invention.

16 Claims, 9 Drawing Sheets

METHOD AND SYSTEM FOR CORRECTING FOR OFFSET-DEPENDENT DIRECTIVITY EFFECTS IN SEISMIC SURVEY SIGNALS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention is in the field of seismic prospecting for oil and gas, and is more specifically directed to signal processing techniques in such prospecting.

In recent years, the use of ocean bottom cable technology for performing seismic surveys in marine regions of the earth has become widespread. As is known in the art, ocean bottom cable technology utilizes acoustic detectors that are deployed at fixed locations at or near the ocean bottom. An acoustic source is towed near the ocean surface, and imparts acoustic energy into the water that is reflected from geological strata and interfaces below the ocean bottom, and measured by the acoustic detectors. The measured signals are, as typical in the seismic prospecting field, indicative of the depth and location of the reflecting geological features. Typically, the ocean bottom detectors include both a geophone and a hydrophone, for recording both pressure and velocity information. This dual-sensor approach enables the elimination of ghost and reverberation effects, for example as described in U.S. Pat. No. 5,774,417, issued Jun. 30, 1998 commonly assigned herewith and incorporated herein by this reference.

Ocean bottom cable detectors are often advantageous, as compared to towed detectors, in performing surveys in crowded offshore regions, such as may be encountered near offshore drilling and production platforms (which are often present, of course, near important hydrocarbon reserves). The cost of each pass of the source vessel through the survey region is also relatively low when using ocean bottom detector cables, considering that the source vessel need not tow hydrophone streamers.

Recently, ocean bottom cable surveys have been used to record multicomponent signals, and thus have provided more information regarding the subsurface lithology in marine regions of the earth. As is known in the art, multicomponent receivers record both pressure and shear wave signals, with the recorded shear wave signals including both horizontal and vertical components. While conventional seismic surveys provide information regarding the location and depth of subsurface formations, comparison of the pressure wave signals to the shear wave components provides useful information concerning the lithology of the reflecting surfaces, further improving the usefulness of the survey in locating important formations from an oil and gas prospecting standpoint. Additionally, multicomponent recording also enables the use of techniques for improving the quality of the seismic data obtained in the marine survey. These benefits and uses of multicomponent recording in the ocean bottom cable context are described, by way of example, in Berg, et al., "SUMIC—Multicomponent sea-bottom seismic surveying in the North Sea—Data Interpretation and Application", presented at the 64$^{th}$ Annual Meeting of the Society of Exploration Geophysicists (1994).

As is known in the art, lithology information is provided, in the multicomponent survey, by the conversion of the incident pressure waves into reflected shear waves by the reflecting formation. This pressure-to-shear wave conversion generally increases (i.e., is more detectable) with the angle of incidence from the vertical, and as such multicomponent acquisition techniques tend to favor the use of long source-receiver offset distances. It has been discovered, however, that horizontal components of pressure-wave reflections that arrive at slant angles at the receiver can contaminate the shear wave signals, especially at long offsets where the horizontal pressure wave components can swamp (in amplitude) the shear wave signal.

By way of further background, separation of pressure (or P) wave and shear (or S) wave components by signal processing techniques is known. An example of such separation is described in Kendall, et al., "Noise analysis, using a multicomponent surface seismic test spread", presented at the 63$^{rd}$ Annual Meeting of the Society of Exploration Geophysicists (1993). This approach performs multicomponent rotation analysis at individual receiver positions for each in a series of ray emergence angles, until one is found that maximizes the energy for P and S waves simultaneously. As such, the method described in Kendall, et al. is a relatively complex and computationally intensive approach.

BRIEF SUMMARY OF THE INVENTION

It is therefore an object of the present invention to provide a method and system for correcting multicomponent seismic signals for directivity variations in reflected pressure waves over a range of offset distances.

It is a further object of the present invention to provide such a method and system which can be practically implemented in an automated manner.

It is a further object of the present invention to provide such a method and system in which the corrections are estimated in a systematic manner over a prestack gather of traces.

It is a further object of the present invention to provide such a method and system in which the horizontal component of reflected pressure waves are minimized, thus minimizing contamination of the shear wave signals.

It is a further object of the present invention to provide such a method and system that can eliminate directivity effects due to dipping geological surfaces, such that amplitude-versus-offset (AVO) analysis may be accurately applied to the resultant signals.

Other objects and advantages of the present invention will be apparent to those of ordinary skill in the art having reference to the following specification together with its drawings.

The present invention may be implemented into a computer system and method for operating the same in which seismic survey signals are recorded over a range of offset distances, for example in a prestack gather such as a common midpoint (CMP) gather. For each reflection event indicated in the gather, a performance function is evaluated over a range of candidate zero-offset directivity values and directivity slopes, in order to identify a directivity for the gather, at which the performance function energy is maximized. Upon determining the directivity for the event, the individual traces in the gather are corrected to minimize the effects of horizontal pressure wave signals in the recorded signals.

BRIEF DESCRIPTION OF THE SEVERAL VIEWS OF THE DRAWING

The file of this patent contains at least one drawing executed in color. The Patent and Trademark Office, upon request and payment of the necessary fee, will provide copies of this patent with color drawings.

DETAILED DESCRIPTION OF THE INVENTION

Figure 1:
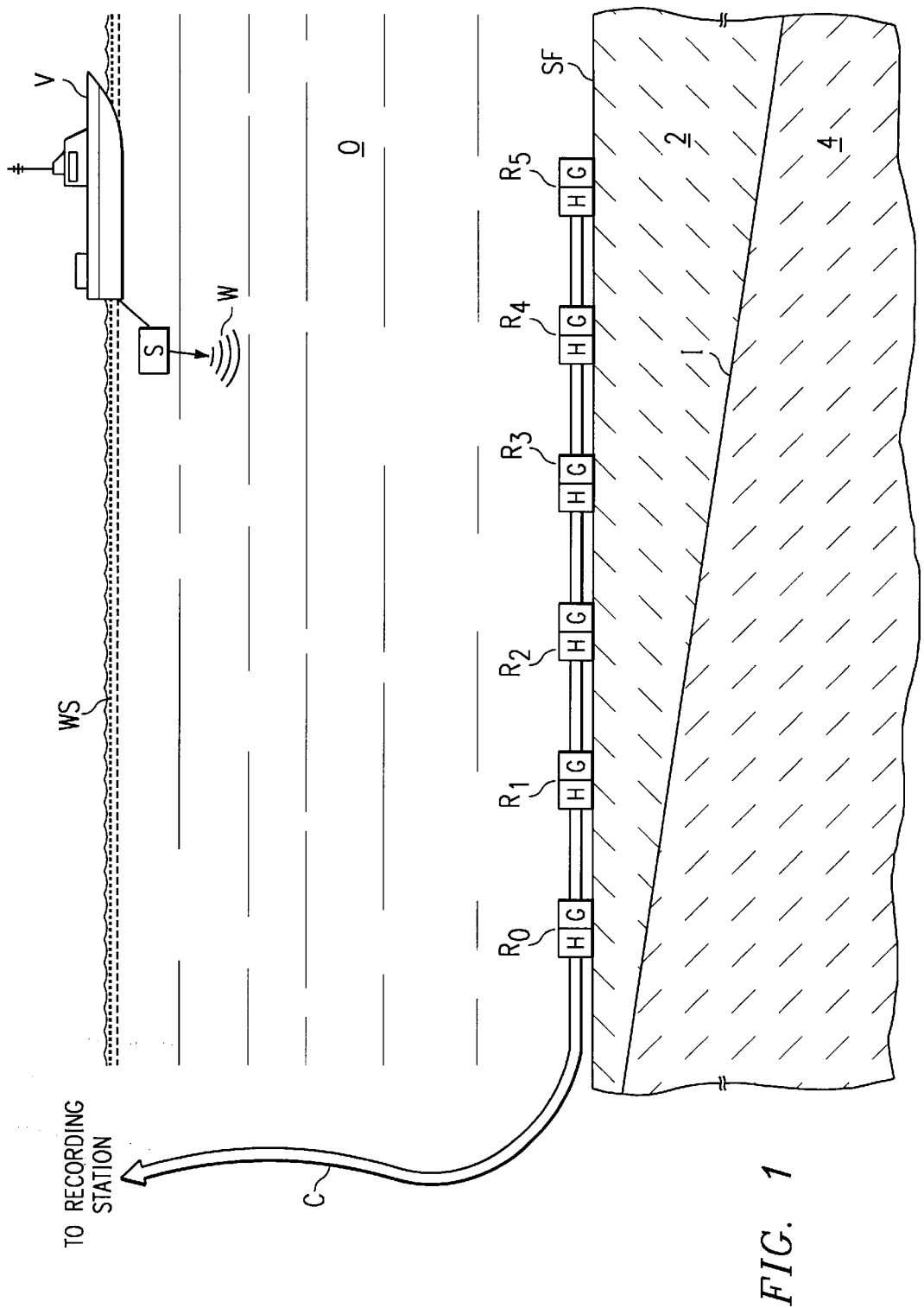
FIG. 1 is a cross-sectional diagram illustrating the acquisition of seismic survey signals using a dual-sensor ocean bottom cable.

Referring first to FIG. 1, an example of an ocean bottom cable seismic survey in connection with which the present invention may be utilized will now be discussed, for purposes of explanation of the present invention. While the preferred embodiments of the invention will be described hereinbelow relative to a marine seismic survey, it is contemplated that the present invention may also be utilized in connection with land-based multicomponent seismic surveys. However, the marine survey example will be discussed herein, considering that the present invention is particularly beneficial when used in connection with multicomponent marine seismic surveys, particularly acquired using ocean bottom cable technology.

In the survey of FIG. 1, vessel V at surface WS of ocean O is towing a source S that is periodically activated to produce acoustic waves; cable C is in place upon seafloor SF, having multiple receiver locations $R_0$ through $R_5$, each having both a hydrophone H for detecting pressure waves and a geophone G for detecting velocity of the wave (i.e., particle motion). According to the preferred embodiment of the invention, geophone G is of the multicomponent type, embedded into the water bottom surface, and as such is able to detect and distinguish pressure waves, vertical velocity, and horizontal velocity. As shown in FIG. 1, source S imparts spherical acoustic wave W downwardly toward seafloor SF. Energy from wave W that is reflected from interface I, between formations 2 and 4, can be detected by hydrophone H and geophone G at receiver locations $R_0$ through $R_5$.

Of course, in an actual marine seismic survey, multiple cables will typically be deployed in parallel over an area, to obtain areal coverage of the surveyed marine region. Additionally, the use of multiple cables, and indeed multiple deployments of parallel cables, can also provide a seismic survey of the so-called "3-D" type, with seismic signals being obtained at varying offset distances (source-to-receiver) and azimuthal angle. While the present invention will be described herein in a 2-D context, it will be understood by those in the art having reference to this description that the present invention will also be useful in connection with such 3-D surveys.

In the example of FIG. 1, interface I between formations 2, 4, involves some amount of horizontal "dip"; as is known in the art, dip refers to the angle from the horizontal (water surface WS or seafloor SF, in this example) defined by interface I. The multicomponent ocean bottom cable survey of FIG. 1 preferably utilizes relatively long offset seismic signals, as noted above, in order to identify pressure wave to shear wave conversion occurring at interface I, as such conversion is indicative of the lithology of underlying stratum 4. Additionally, long offset signals are useful in connection with amplitude-versus-offset (AVO) seismic survey analysis, according to which indicators of oil and gas bearing formations are generated, as described, for example, in Swan, "Properties of direct AVO hydrocarbon indicators", *Offset-dependent reflectivity—Theory and Practice of AVO analysis* (Castagna, J. P. & Backus, M. M., eds., Soc. Expl. Geophys., 1993), pp. 78–92, incorporated herein by this reference. Other examples of AVO analysis are described in U.S. Pat. No. 5,661,697, issued Aug. 26, 1997, commonly assigned herewith, and incorporated herein by this reference.

Figure 2:
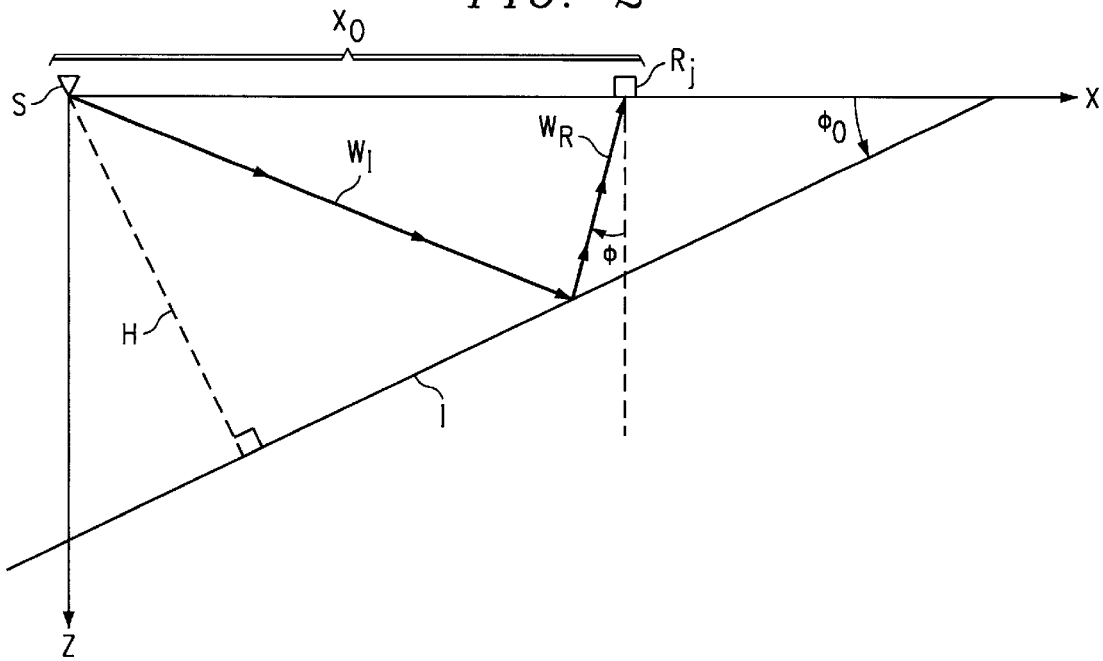
FIGS. 2, 3, and 4 are geometric diagrams illustrating various geometrical relationships in the reflection of a seismic signal from a reflective geological interface.

However, it has been observed, in connection with the invention, that pressure waves reflecting from interface I can, especially at slanting dip angles as illustrated in FIG. 1, include a transverse component that contaminates shear wave signal energy that may be generated by pressure-to-shear wave conversion at interface I. Additionally, the energy contained within this transverse component accordingly reduces the signal energy of the longitudinal pressure wave itself. Referring now to FIG. 2, the sensing of the transverse pressure wave component will now be described geometrically.

In FIG. 2, receiver location $R_j$ is disposed at an offset distance $x_0$ from source location S. An incident pressure wave is generated at source location S, travels along wave path $W_I$ until reaching interface I, at which the wave is reflected, and travels to receiver location $R_j$ along reflected wave path $W_R$. While the pressure wave generated at source location S is of course a spherical wave, only the wavefront traveling along paths $W_I$ and $W_R$ are of interest in this example of source location S and receiver location $R_j$. Furthermore, in the ocean bottom survey case illustrated in FIG. 1, source location S will of course be at a different z position than receiver location $R_j$, but collinear with incident wave path $W_I$. In this example, interface I dips from the horizontal by a dip angle $\phi_0$; as a result, reflected wave path $W_R$ deviates from the vertical by a direction angle $\phi$.

As noted above, multicomponent detection capability is present at receiver location $R_j$, such that seismic waves in both the vertical (z-direction) and horizontal (x-direction) are sensed. However, the seismic energy sensed at receiver location $R_j$ includes both a portion that is in the ray direction of reflected wave path $W_R$ (i.e., a longitudinal component), and also a portion that is transverse to the direction of reflected wave path $W_R$ (i.e., a transverse component). The transverse component is produced mostly by wavetypes such as vertically polarized shear waves and Rayleigh waves. The portion of the seismic energy that is transverse to the direction of reflected wave path $W_R$ is undesirable, as this component not only reduces the energy of the true, longitudinal, pressure wave signal, but also contaminates any shear wave signals generated at interface I, which may be of interest.

Figure 3:
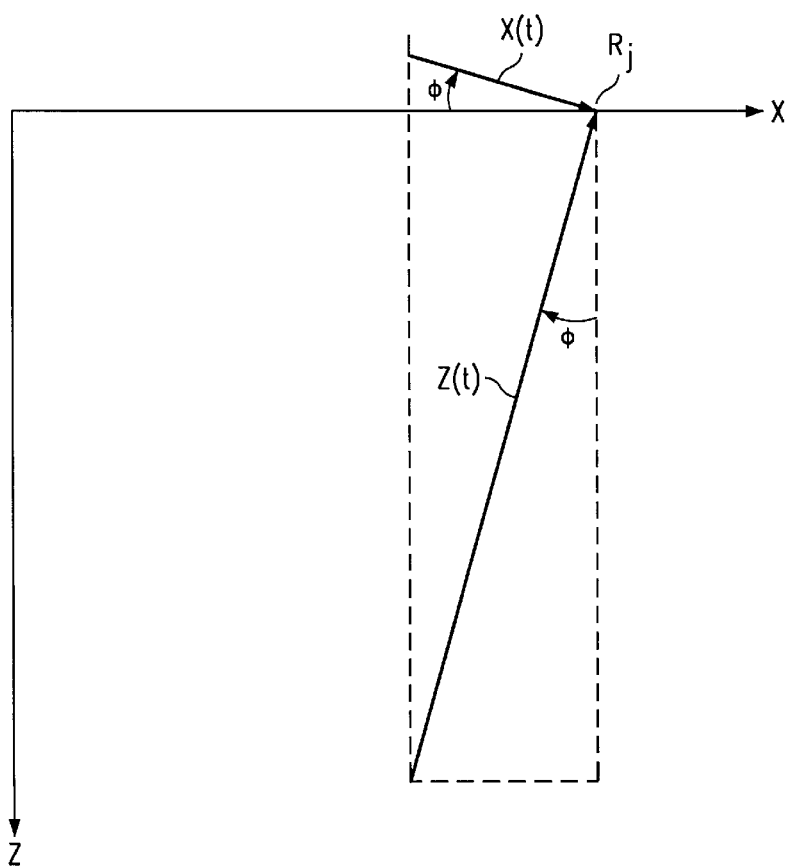

FIG. 3 illustrates the presence of the longitudinal and transverse components of the pressure wave at receiver location $R_j$. In FIG. 3, the longitudinal component of the pressure wave is illustrated as vector Z(t), while the transverse component is illustrated as vector X(t). As illustrated in FIG. 3, the longitudinal pressure wave signal component Z(t) is at angle $\phi$ from the vertical. Additionally, receiver location $R_j$ includes pressure wave sensors that sense time-domain signals that are in the vertical direction (along the z-axis) and in the horizontal, or in-line, direction (along the x-axis, or parallel to the shot line). Both the longitudinal Z(t) and transverse X(t) components of the reflected pressure wave contribute to the recorded signals along both these axes. Considering x(t) to correspond to the recorded signal at receiver location $R_j$ in the x-axis direction, and z(t) to correspond to the recorded signal at receiver location $R_j$ in the z-axis direction, one may express the longitudinal Z(t) and transverse X(t) components in terms of the measured in-line x(t) and vertical z(t) signals as follows:

$$Z(t)=z(t)\cos\phi - x(t)\sin\phi$$

$$X(t)=z(t)\sin\phi + x(t)\cos\phi$$

Inspection of FIG. 3 readily indicates these expressions for Z(t) and X(t). The angle $\phi$ will, of course, vary with the source-receiver offset distance over the survey.

Figure 4:
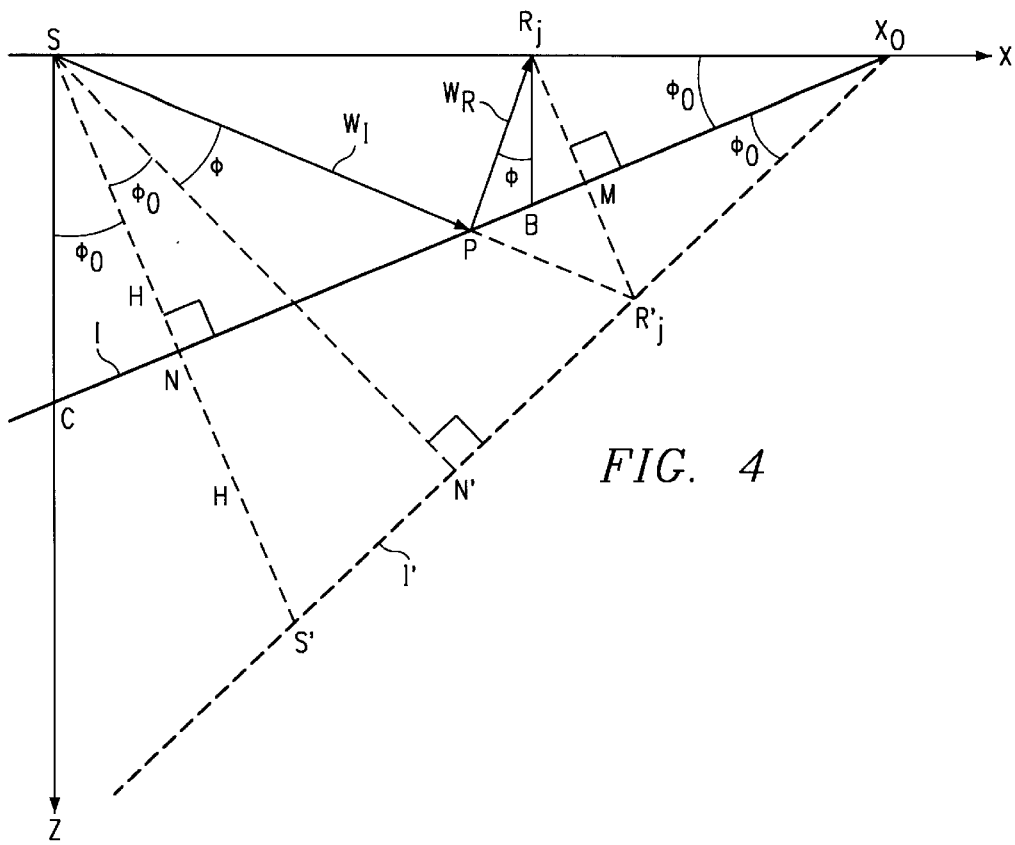

Through geometric considerations, one may express the angle $\phi$ relative to the dip angle $\phi_0$. FIG. 4 illustrates the plane geometry relationship of the wave paths $W_I$, $W_R$ in the example of FIG. 2. In this example, point P is the point on interface I at which the pressure wave from source location S is reflected to receiver location $R_j$; as before interface I has a dip angle $\phi_0$ from the horizontal. Projection of a perpendicular from source location S to interface I (at point N) defines a length H; the angle from the vertical (z-axis) defined by this perpendicular is also the dip angle $\phi_0$, as is evident from the geometry of FIG. 4. Considering a point $x_0$ at which interface I, if extended at the dip angle $\phi_0$, crosses the x-axis, a false interface I' is also defined as extending from point $x_0$ at an angle of $2\phi_0$. Extension of the perpendicular from line segment S-N to false-interface I' defines another length H; the perpendicular from source location S to false interface I' (at point N') is at an angle $\phi_0$ from line segment S-N. Extension of incident wave path $W_I$ past point P, to false interface I', establishes a point R', while extension of line segment S-N to false interface I' defines a point S'. Point C corresponds to the intersection of interface I with the z-axis below point S, point B corresponds to the point on interface I directly beneath point $R_j$, and point M corresponds to the intersecting point along interface I of a vertical thereto from point $R_j$.

Through rudimentary plane geometry, the distance S' to R' along false interface I' equals the source-receiver offset distance S–$R_j$ along the x-axis. Specifically, given that the angle $\angle SX_0N$ equals the angle $\phi_0$, $\angle NX_0S'$ also equals the angle $\phi_0$, from which one may conclude that $\Delta SCN$ is similar to $\Delta X_0SN$ and also to $\Delta BR_jM$. Further, one may readily determine that angles $\angle CSN$, $\angle BR_jM$, $\angle SX_0N$ all equal $\phi_0$. Knowledge of these angles allows the observation that $\Delta NSP$ is similar to $\Delta PR_jM$, from which $\angle NSP$ and $\angle PR_jM$ each equal $\phi+\phi_0$, and $\angle N'SP$ equals $\phi$.

As a result of the foregoing analysis, one may readily determine that the distance N'–R' is equal to:

$$x - 2H\sin\phi_0$$

where x is the offset distance from source location S to receiver location $R_j$ (and thus the distance between points S' and R'), and considering that the distance between points S' and N' is determined according to the right triangle defined by points S, S', N'. Since the distance between points S and N' is also defined by this right triangle as $2H\cos\phi_0$, one may determine the direction $\phi$ at which reflected ray path $W_R$ deviates from the vertical from:

$$\tan\phi = \frac{x - 2H\sin\phi_0}{2H\cos\phi_0}$$

As such, based upon the reflector geometry as illustrated in FIGS. 2 and 4, one may readily express the tangent of the direction $\phi$ of reflected wave path $W_R$ as a linear function of the source-receiver offset x. The direction $\phi$ therefore changes with offset distance x in a linear fashion, and thus in a systematic and predictable manner. The present invention uses this systematic offset-dependent variation of the direction $\phi$ to determine the longitudinal Z(t) and transverse X(t) components of the pressure wave signal.

Given the above expression for the tangent of the direction $\phi$ as a linear function of offset, one may rewrite the expression in the form:

$$\tan\phi = D - Ex$$

In this expression, $D = -\tan\phi_0$, and is defined herein as the zero-offset directivity. The coefficient E is defined herein as the directivity slope, and has the value:

$$E = \frac{\tan\phi - \tan\phi_0}{X_{ref}}$$

where $X_{ref}$ is a reference offset distance, preferably a maximum offset value in the survey. According to the preferred embodiment of the present invention, the zero-offset directivity D and the directivity slope E are determined for each event in a prestack gather of traces, such that corrections may be determined as a function of offset distance over the gather.

Figure 5:
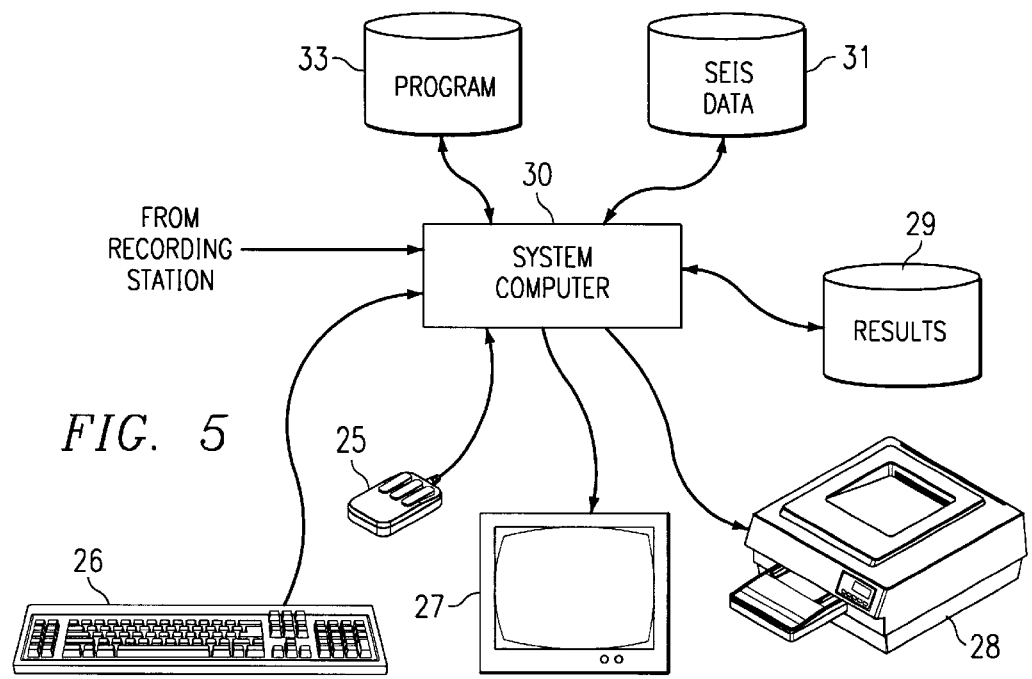
FIG. 5 is an electrical diagram, in block form, of a computer system programmed according to the preferred embodiment of the invention.

Referring now to FIG. 5, a computer system into which the preferred embodiment of the invention may be implemented will be described. This system includes system computer 30, which may be implemented as any conventional personal computer or workstation, for example a SPARCstation available from Sun Microsystems Inc., implemented either in standalone fashion or as part of a network arrangement. System computer 30 is in communication with disk storage devices 29, 31, and 33, which are preferably external hard disk storage devices in a network. It is contemplated that disk storage devices 29, 31, 33 may be either directly connected to system computer 30, or indirectly accessible by way of a local area network or by remote access. Of course, while disk storage devices 29, 31, 33, are illustrated as separate devices, a single disk storage device may of course be used to store any and all of the program instructions, measurement data, and results as desired.

In this embodiment of the invention, seismic signals from ocean bottom cable C are received by a recording station, such as may be in situ at the survey locations, and are forwarded to system computer 30 as shown in FIG. 5. System computer 30, after conventional formatting and other initial processing, stored on disk storage device 31. System computer 30 will then retrieve the appropriate data from disk storage device 31 in order to perform the processing described hereinbelow. This operation by system computer 30 is controlled by a sequence of program instructions, written in the form of a computer program (e.g., in C++ or in another suitable language) and stored in computer-readable memory, such as program disk storage device 33 of FIG. 5; of course, the memory medium storing the computer program may be of any conventional type used for the storage of computer programs, including hard disk drives, floppy disks, CD-ROMs and other optical media, magnetic tape, and the like.

According to the preferred embodiment of the invention, system computer 30 presents output onto graphics display 27, or alternatively via printer 28; further in the alternative, system computer 30 may store the results of the analysis described hereinbelow on disk storage device 29, for use in further analysis. Keyboard 26 and pointing device (e.g., a mouse, trackball, or the like) 25 are provided with system computer 30 to enable interactive operation. As noted, system computer 30 is able to communicate with disk storage devices 29, 31, including external hard disk storage on a network and floppy disk drives. System computer 30 is typically located at a data center remote from the survey region.

Figure 6:
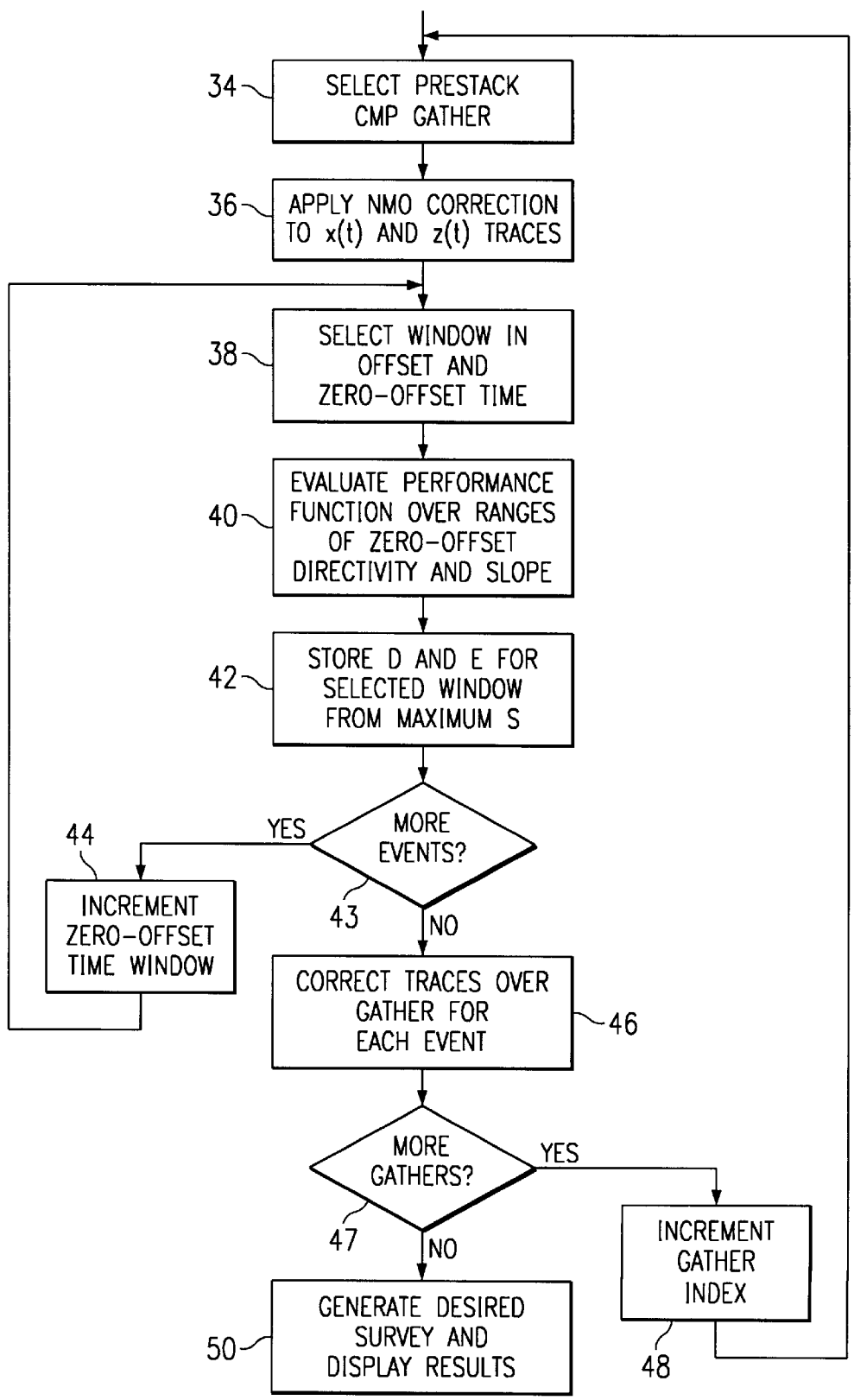
FIG. 6 is a flow chart illustrating the operation of the computer system of FIG. 5 in performing the correction method according to the preferred embodiment of the invention.

Referring now to FIG. 6, a method of correcting seismic signal traces for directivity effects, particularly in eliminating transverse pressure wave signals from consideration in generation of a seismic survey, will now be described in detail. The method according to the preferred embodiment of the invention begins with process 34, in which system computer 30 retrieves, from memory, digital data corresponding to a group of traces having a common midpoint, accordingly, the traces retrieved in process 34 are referred to as a common midpoint (CMP) gather. As is conventional in the art, the traces in the gather that are retrieved in process 34 correspond to seismic signals obtained over a wide range of source-receiver offset distances. Since the system of FIG. 5 operates upon discrete digital data, the traces retrieved in process 34 are sequences of discrete values. However, for purposes of the present description, the traces retrieved in process 34 will be referred to as time-domain signals, indicating their physical nature as signals of detected acoustic energy over time. Additionally, according to the preferred embodiment of the invention, both the vertical z(t) and horizontal x(t) traces are retrieved in process 34.

Following retrieval of the current CMP gather in process 34, according to the preferred embodiment of the present invention, process 36 is next performed to apply normal moveout ("NMO") time shift corrections to the traces in the CMP gather. As is well known in the art, normal moveout correction is conventionally performed by the determination of a stacking velocity $V_g$, or more generally, a stacking velocity time function $V_g(T_0)$ considering that the stacking velocities may vary with zero-offset time of the reflection event, to account for variations in the acoustic velocities over different subsurface strata at the various depths. The correction is performed by applying a time shift $\Delta T_x$ to each trace, depending upon its offset distance X and the stacking velocity $V_g$, through use of the well-known Dix equation:

$$(T_0 + \Delta T_X)^2 = T_0^2 + \frac{X^2}{V_g^2}$$

where $T_0$ is the zero offset reflection time of the reflection, typically based upon an extrapolation. Other normal moveout correction techniques, for example a dispersive NMO correction as described in copending application Ser. No. 08/745,452, filed Nov. 12, 1996, commonly assigned herewith and incorporated hereinto by this reference, may alternatively be performed in process 36. Additionally, other filtering and processing techniques, known in the art to be beneficial as applied to prestack gathers, may also be applied; an example of such processing includes correction for spherical divergence. In any event, process 36 serves to arrange common detected reflective events in the multiple traces of the gather at about the same point in time along the time axis (i.e., at the zero-offset time), independently of the offset distance corresponding to each trace. The NMO corrections are applied to both the vertical and horizontal detected components of the pressure wave.

Figure 7:
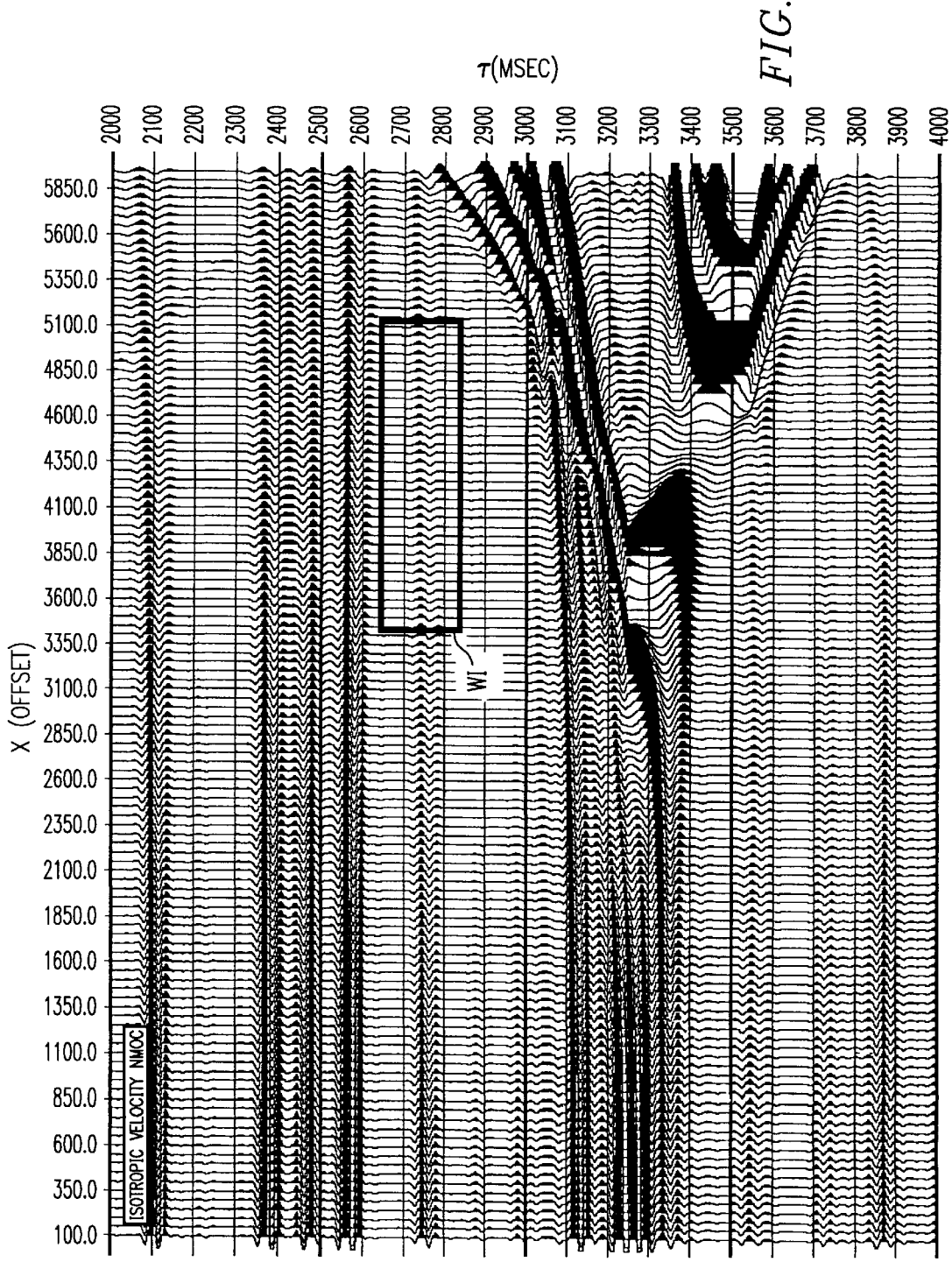
FIG. 7 is a plot of traces in an NMO-corrected prestack gather, illustrating an example of the placement of a window of interest, in the correction method according to the preferred embodiment of the invention.

In process 38, a window of investigation is selected from the gathered and corrected traces. This window of investigation considers the corrected traces in the gather as arranged according to their offset distances, as the window of investigation selected in process 38 is bounded by a selected range of offset distance. Preferably, the offset distance range of the selected window includes significant offset distances (i.e., rather than small offsets at or near the zero-offset traces), in order to obtain accuracy in the directivity analysis performed by the method of FIG. 6. The window of investigation also is bounded by zero-offset times, so that the selected window includes a single reflective event. It is preferred that each reflective event in the gather of traces be considered in its own window, selected in process 38, as it is contemplated that the directivity effects vary among the individual reflective interfaces in the survey. FIG. 7 illustrates an example of a window of investigation WI selected in process 38, the selected window WI being within the vertical pressure waves over a range of zero-offset time ($\tau$) and offset distance (x) in an NMO corrected prestack gather of vertically measured pressure wave traces z(t); a corresponding window WI is similarly selected in the horizontally measured, in-line, pressure wave traces x(t).

In process 40, system computer 30 evaluates a performance function over window of investigation WI, over a range of values for zero-offset directivity D and directivity slope E. The performance Junction evaluated in process 40 is preferably a function which has a resultant value that indicates minimized transverse energy in the pressure wave as sensed at the receiver locations. According to the preferred embodiment of the invention, process 40 evaluates a performance function $S(\tau: D, E)$ which is expressed as follows:

$$S(\tau: D, E) = \frac{\sum_{WI}\{Z^2(t, x)\}}{\sum_{WI}\{Z^2(t, x) + X^2(t, x)\}}$$

In this expression, the expressions $Z^2(t,x)$ and $X^2(t,x)$ are the longitudinal and transverse energy, respectively, of the pressure waves at a given paired value of time t and offset x. The sums included in the performance function S are taken over the time t and offset x values within window of investigation WI.

For purposes of the preferred embodiment of the present invention, evaluation process 40 begins with the determination of the linear relationship of the direction φ as a function of offset distance x for the selected values of zero-offset directivity D and directivity slope E. Determination of the direction φ is defined by evaluating the function:

$$\tan \phi = D - Ex$$

One may then readily determine direction φ as the inverse tangent ($\tan^{-1}$) of D−Ex. Once the direction φ is determined, longitudinal and transverse traces are then derived for each pair of vertical measured component z(t) and horizontal measured component x(t) traces, within the window of investigation WI, based on the equations, expressed as follows for the jth traces:

$$Z_j(t)|_{WI} = \{z_j(t)\cos \phi - x_j(t)\sin \phi\}|_{WI}$$

$$X_j(t)|_{WI} = \{z_j(t)\sin \phi + x_j(t)\cos \phi\}|_{WI}$$

discussed above. The squaring of these expressions corresponds to a simple autocorrelation of each trace $Z_j(t)$ and $X_j(t)$ over the window, with the eventual sum corresponding to a summing of the autocorrelation traces within the window of investigation WI.

Evaluation process 40 is repeated, for the same window of investigation WI selected in process 38, for multiple values of zero-offset directivity D and directivity slope E within a selected range of these values. It is contemplated that, in most cases, process 40 is repeated as a two-dimensional search of values D and E. Alternatively, if horizontal dipping can be assumed (i.e., $D = -\tan\phi_0/X_{ref} = 0$), it is contemplated that only a single dimensional search of directivity slope E is necessary. Further in the alternative, process 40 may be performed by presetting zero-offset directivity D in those cases where the reflective interface dip $\phi_0$ is known, such as from a previously performed horizon interpretation process applied to the seismic survey region.

Upon completion of process 40 for all of the desired values of zero-offset directivity D and directivity slope E, system computer 30 determines the pair of zero-offset directivity D and directivity slope E which returned the maximum value of performance function S(τ: D, E). According to the preferred embodiment of the present invention, the maximum value of performance function S(τ: D, E) identifies the value of zero-offset directivity D and directivity slope E which most closely identify the directivity of the interface I for the selected event, as the performance function S(τ: D, E) is a ratio of the energy of the longitudinal wave to the total energy of the seismic wave (i.e., the vector sum of the longitudinal and transverse components). This pair of values of zero-offset directivity D and directivity slope E are then stored by system computer 30 in memory, in association with the reflection event of the current window of interest WI, for use in correcting the traces in the gather, as will be described hereinbelow.

System computer 30 then determines, in decision 43, whether additional events (i.e., zero-offset times) remain to be analyzed for directivity in the current selected gather. If so (decision 43 is YES), control passes to process 44 in which the window of investigation WI is incremented to include the next possible reflection event indicated in the traces in the selected gather. If the current gather has been analyzed to cover the zero-offset times desired (i.e., decision 43 is NO), then the process continues with correction process 46, as will now be described.

Correction process 46 uses, for each gather, the zero-offset directivity D and directivity slope E values that were derived in process 40 for each reflective event in the selected gather, and applies the appropriate correction factors to each trace based thereupon. As noted above, since processes 40, 42 are performed for each window of investigation WI along the time axis, in a manner preferably corresponding to each reflective event (considering that the directivity effects likely differ among geological interfaces), the corrections applied in process 46 will differ as a function of zero-offset time.

Process 46 applies a correction to each of the horizontally measured, in-line, h(t) and vertically measured z(t) pressure wave traces in the gather, in effect by way of a transform. As noted above, the horizontal h(t) component of the seismic wave is detected by a horizontally-oriented (in the x-axis, or in-line, direction) detector in the geophone at each receiver location $R_j$; similarly, the vertical z(t) component of the seismic wave is detected by a vertically-oriented geophone detector thereat. According to the preferred embodiment of the invention, for purposes of analyzing the pressure wave, the particular component orientation of the pressure wave relative to the earth is not important; rather, the longitudinal component Z(t) of the pressure wave that is directed along the reflected wave ray path (e.g., path $W_R$ in FIG. 2) is of interest, with the transverse component X(t) constituting noise.

Process 46 thus utilizes the expressions provided hereinabove for the conversion of the horizontally and vertically sensed energy x(t), z(t), respectively, into the longitudinal and transverse wave components Z(t), X(t), respectively. As noted above, for a given reflection event (or zero-offset time window), process 42 has stored the optimum values of zero-offset directivity D and directivity slope E according to which the longitudinal energy as expressed by the performance function S(τ: D, E) is maximized. Because the values of zero-offset directivity D and directivity slope E determine the linear relationship between direction φ and offset distance x as follows:

$$\tan \phi = D - Ex$$

the angle φ can be readily derived for any offset distance x from zero to the maximum value ($X_{ref}$). Since each trace in the gather is associated with a specific offset distance x, each trace in the gather thus is associated with a specific direction φ at which the reflected wave ray path $W_R$ deviates from the perpendicular. Upon determining direction φ for a given offset distance x and thus for a specific trace (or traces, in the present example where both horizontal and vertical pressure wave traces are recorded), system computer 30 performs process 46 in which new traces Z(t) and X(t) are generated according to the relationships:

$$Z(t) = z(t)\cos \phi - x(t)\sin \phi$$

$$X(t) = z(t)\sin \phi + x(t)\cos \phi$$

discussed above. Trace Z(t) corresponds to the actual longitudinal seismic wave component that is in the direction of reflected wave ray path $W_R$, while trace X(t) corresponds to the transverse component (i.e., 90° relative to reflected wave ray path $W_R$). Trace X(t) is minimized, according to the preferred embodiment of the invention, through the selection of process 42 based upon the maximum value of the performance function evaluated in process 40 for the gather. These corrected traces Z(t) and X(t) are then stored by system computer 30 in its memory, for example in disk storage device 29, for use in generating the desired seismic survey and analysis. Alternatively, the X(t) traces may be disregarded and not stored, in the event that the analyst determines that the transverse components of the pressure wave are not significant, or constitute noise.

Upon completion of the correction of process 46 for the traces in the current gather, decision 47 is executed by system computer 30 to determine if additional gathers remain to be processed. If so (decision 47 is YES), process 48 increments a gather index in order to point to the next gather in the survey, and the process of FIG. 6 is repeated from selection process 34.

Upon all of the gathers having been processed (decision 47 is NO), control passes to process 50 in which the remainder of the signal processing desired for generation of the desired survey is performed. Process 50, which is also performed by system computer 30, includes conventional signal processing operations such as stacking of the gathers (for elimination of random noise, as known in the art), filtering, and generation of a 2-D or 3-D survey. The present invention is also particularly beneficial in the generation of amplitude-versus-offset (AVO) surveys, in which the traces in a gather are not stacked, but instead are used to generate an AVO intercept and an AVO slope indicative of the variation of signal amplitude as a function of offset; as described in Swan, op. cit., and in U.S. Pat. No. 5,661,697, incorporated hereinabove by reference, indicators of the presence of hydrocarbons may be generated from the AVO intercept and AVO slope values, thus providing interpretation information from the survey.

Figures 8A, 8B:
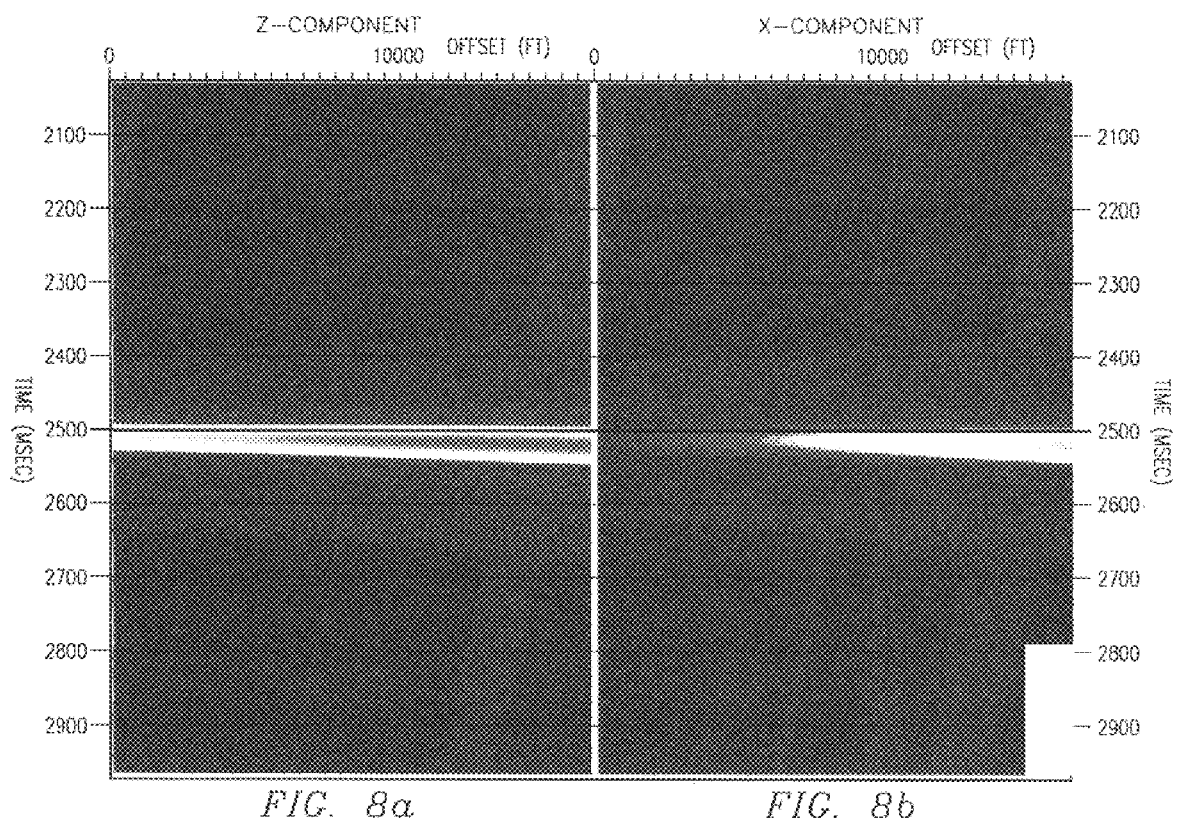
FIGS. 8a and 8b are plots illustrating the energy of sequences of vertical and horizontal components, respectively, of a synthesized pressure wave.

Referring now to FIGS. 8a, 8b, 9, 10a and 10b, an example of the results of the preferred embodiment of the invention will now be described relative to a synthetic set of traces. FIGS. 8a and 8b respectively illustrate vertical and horizontal components of reflection responses that were synthetically generated with an elastic wave-modeling program. The signals illustrated in FIGS. 8a and 8b represent synthetic signals as reflected from a simple horizontal layer model, after the application of spherical divergence correction and normal moveout. As evident from FIG. 8b, a significant amount of energy is present in the horizontal component of the traces. As noted above, this horizontal component presents significant noise in the determination of pressure-to-shear conversion, and also reduces the energy in the desired pressure wave signal.

Figure 9:
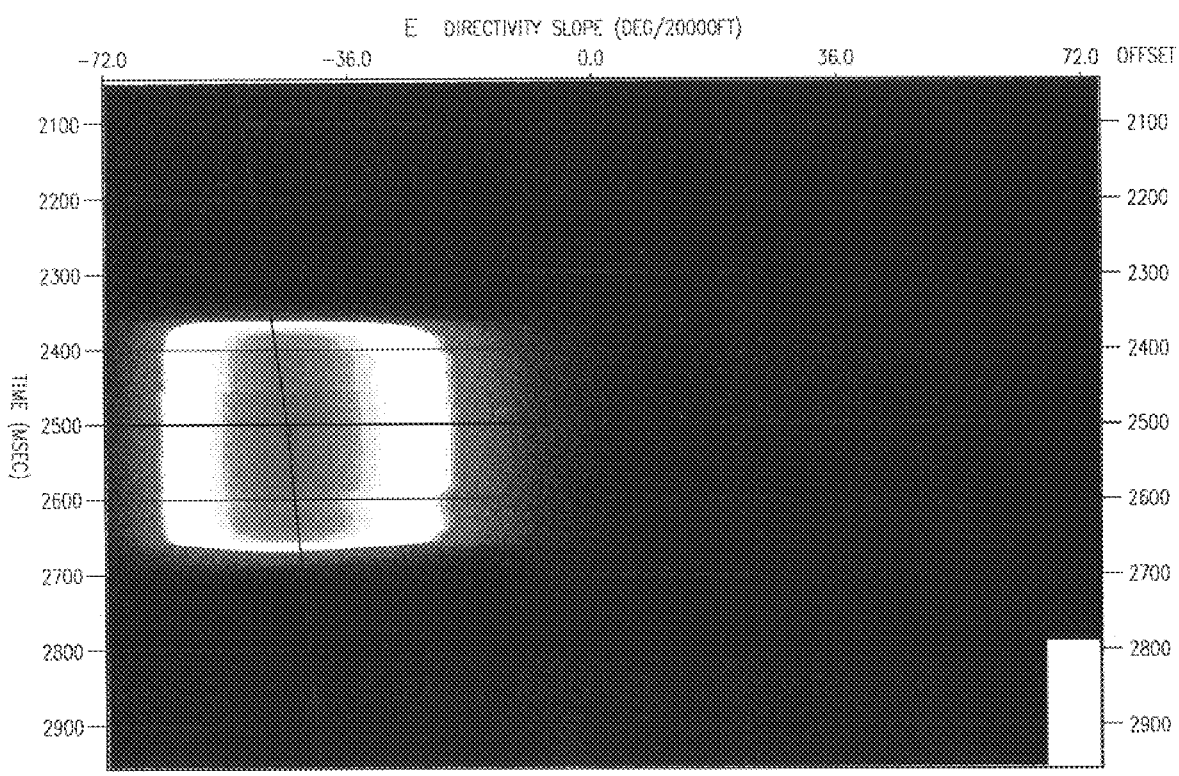
FIG. 9 is a plot of energy versus directivity slope and zero-offset time, as generated according to the correction method of the preferred embodiment of the invention upon the signals of FIGS. 8a and 8b.

FIG. 9 illustrates a directivity versus offset spectrum analysis, as produced by the method according to the preferred embodiment of the invention as described above relative to FIG. 6, and specifically representing the results of process 40 over all of the traces in the gather. The plot of FIG. 9 is of the value E, referred to above as directivity slope, which is in the units of degrees/20,000 feet ($X_{ref}$ corresponding to 20,000 feet in this example). The brightness indicator in the plot of FIG. 9 is indicative of the energy of the performance function S at the particular zero-offset time and directivity slope. For the event occurring at a zero-offset time of about 2500 msec, FIG. 9 indicates that the appropriate directivity slope value E is about 80°/20,000 ft. Because the modeled reflective layer is horizontal (i.e., with no dip), the zero-offset directivity D is 0°. Process 42 effectively selects the values of directivity slope and zero-offset directivity for a given event; with the single event of FIGS. 8a, 8b, only this particular pair of values need be determined in this example. With these results, the direction φ for each offset can be readily derived, and corrections made to the traces.

Figures 10A, 10B:
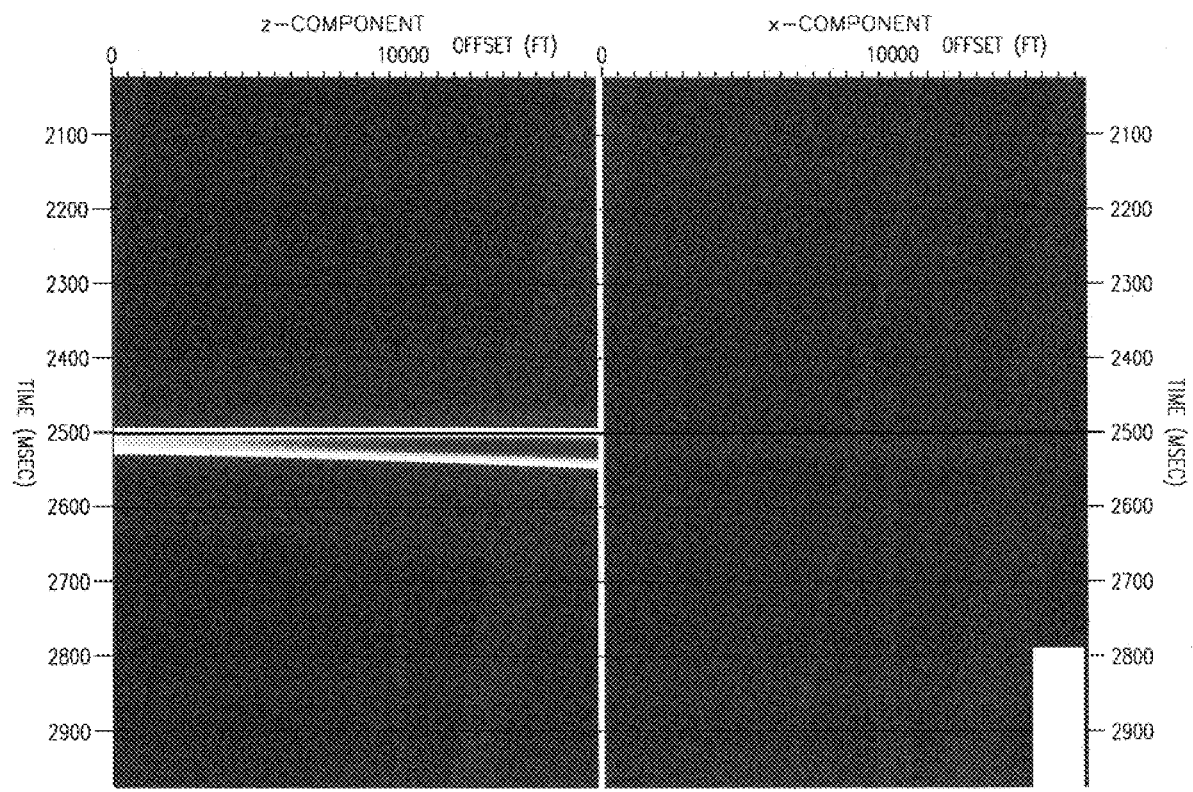
FIGS. 10a and 10b are plots illustrating the energy of sequences of longitudinal and transverse components of the synthesized pressure waves illustrated in FIGS. 8a and 8b, respectively, corrected according to the preferred embodiment of the invention.

FIGS. 10a and 10b illustrate the corrected reflection response traces Z(t), X(t), using the directivity slope E derived from FIG. 9. As illustrated particularly in FIG. 10b, the transverse component of the pressure wave signals is substantially eliminated. A comparison of FIG. 10a to FIG. 8a also indicates, with the higher intensity colors, that the energy of the pressure waves has been "steered" into the longitudinal pressure wave signal, thus boosting the true reflection signal from that which was previously present.

Figure 11:
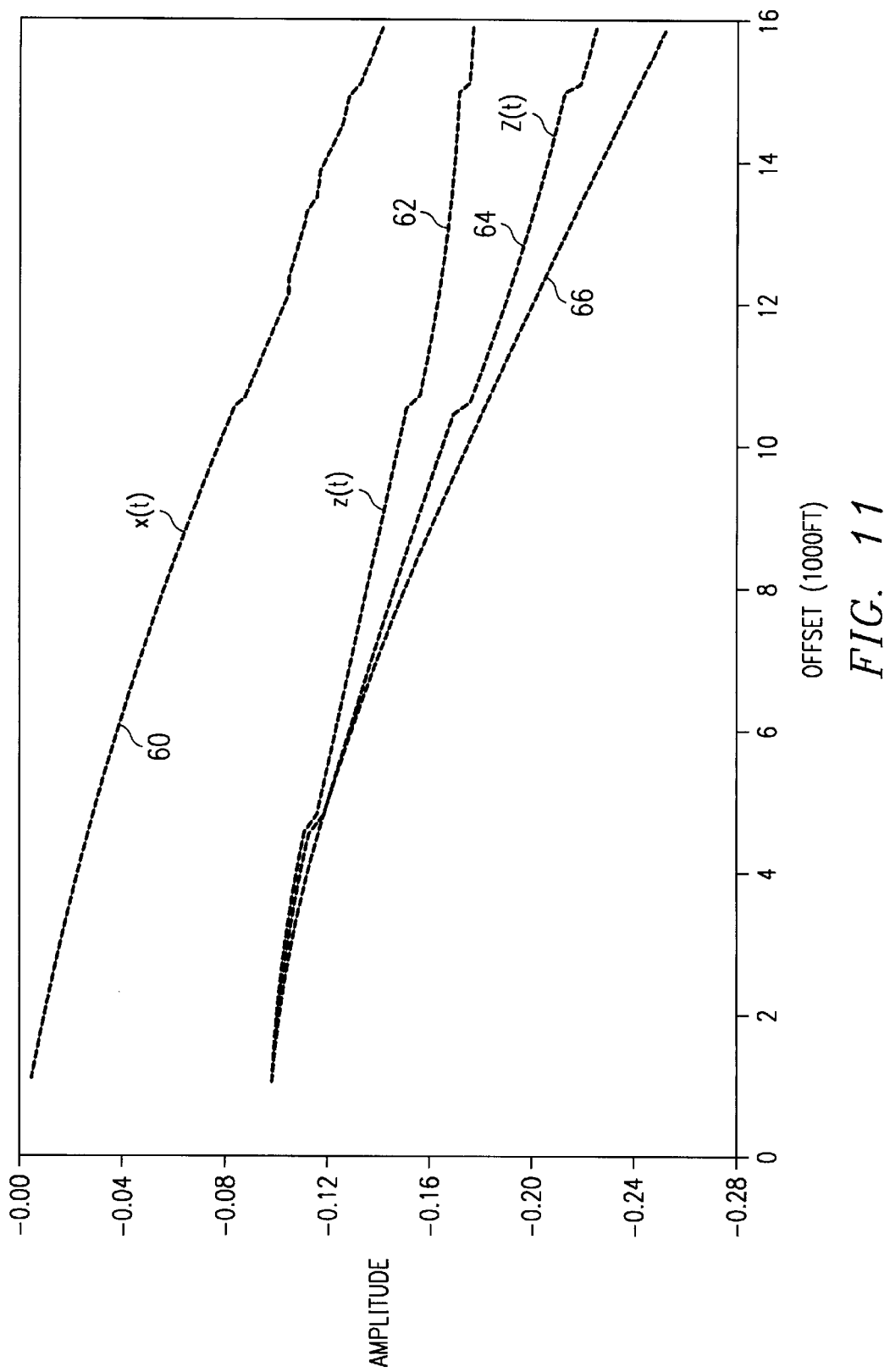
FIG. 11 is an amplitude-versus-offset plot of the horizontal and vertical components of FIGS. 8a and 8b, of the longitudinal component of FIG. 10a, and of the true Zoeppritz reflection for the synthesized signals.

Referring now to FIG. 11, a comparison of the amplitude-versus-offset behavior of the synthesized signals of FIGS. 8a, 8b, 10a, 10b is illustrated. Curve 60 illustrates the amplitude-versus-offset behavior of the horizontal component x(t) shown in FIG. 8b, while curve 62 illustrates the amplitude-versus-offset behavior of the vertical component z(t) of FIG. 8a. Curve 66, on the other hand, illustrates the "true" AVO behavior of the synthesized signal according to the well-known Zoeppritz reflectivity formula described in Aki, et al., *Quantitative Seismology—Theory and Methods* (Freeman & Co., 1980), pp. 123–192. Curve 64 illustrates the corrected in-line pressure wave signal Z(t) after the corrections of process 46 described hereinabove. As is evident from the comparison of curves 62, 64, the correction according to the preferred embodiment of the invention provides a longitudinal pressure wave signal that closely approximates the Zoeppritz AVO plan reflection; the remaining discrepancies between curves 62, 64 are believed to be due to modeling and processing attributes, arising from point-source approximation, spherical divergence correction, NMO stretch, and the like.

According to the preferred embodiment of the present invention, therefore, important advantages are provided in the generation of seismic surveys. The correction for directivity variation with offset in pressure waves, as provided by the present invention, is provided in a practical and robust manner, by estimating systematic offset-dependent directivity. In effect, the present invention "steers" the entire gather toward the directivity of the pressure-wave reflection, such that the longitudinal pressure wave signals are maximized and the transverse component is minimized. As a result, the transverse component energy in the pressure wave is minimized in the traces, permitting improved accuracy in analysis of pressure-to-shear wave conversion at the reflective interface. Furthermore, since the horizontal component of the received signal is much more sensitive to acoustic changes in the x-direction, the present invention is particularly useful in high-velocity near-surface areas, and in long-offset surveys, where the angles of the reflected rays from the vertical are relatively large.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of operating a computer to correct seismic signals for use in a seismic survey, comprising the steps of:
    retrieving, from computer memory, data corresponding to a first gather of paired seismic traces, each trace representative of acoustic energy traveling through subsurface geological structures and detected at one of a plurality of receiver locations, each trace in the first gather corresponding to a receiver located at an offset distance, and each pair of traces associated with a common receiver location and including a horizontal trace corresponding to horizontally-sensed energy and a vertical trace corresponding to vertically-sensed energy;

estimating, for at least a first reflection event detected in the paired seismic traces for the first gather, a zero-offset directivity value and a directivity slope value;

determining, for each of the plurality of paired seismic traces in the first gather, a direction angle from the zero-offset directivity value and the directivity slope value, and from the offset distance of the receiver location associated with the paired seismic traces;

generating, for each of the plurality of paired seismic traces in the first gather, a longitudinal seismic trace based upon a combination of the horizontal and vertical seismic traces and the direction angle; and storing the longitudinal seismic traces in the computer memory.

2. The method of claim 1, further comprising:

generating, for each of the plurality of paired seismic traces in the first gather, a transverse seismic trace based upon a combination of the horizontal and vertical seismic traces and the direction angle; and storing the transverse seismic traces in the computer memory.

3. The method of claim 1, further comprising:

prior to the estimating step, applying normal move-out corrections to the traces in the gather.

4. The method of claim 1, further comprising:

repeating the estimating, determining, generating, and storing steps for a plurality of reflection events detected in the paired seismic traces for the first gather.

5. The method of claim 1, further comprising:

repeating the retrieving, estimating, determining, generating, and storing steps for a plurality of gathers of paired seismic traces.

6. The method of claim 1, wherein the estimating step comprises:

selecting a window of interest over the plurality of paired seismic traces;

for portions of each of the paired seismic traces in the selected window of interest, and for each of a plurality of trial values of zero-offset directivity value and directivity slope, evaluating a performance function based upon a ratio of energy of estimated longitudinal seismic energy to a sum of estimated longitudinal seismic energy and transverse seismic energy;

determining the trial values of zero-offset directivity value and directivity slope for which the evaluating step returns a maximum value; and storing, in the computer memory, the values of zero-offset directivity value and directivity slope determined in the determining step, as the zero-offset directivity value and a directivity slope for the reflection event.

7. The method of claim 1, further comprising:

generating a seismic survey from the stored longitudinal traces.

8. The method of claim 1, wherein the seismic traces correspond to pressure wave energy sensed at the plurality of receiver locations.

9. The method of claim 8, wherein the receiver locations correspond to seafloor locations, and wherein the seismic traces correspond to pressure wave energy sensed by ocean bottom cable sensors deployed at the seafloor locations.

10. A computer system for correcting seismic survey signals corresponding to acoustic energy detected over time at a plurality of receiver locations, such detected energy corresponding to acoustic energy reflected from subsurface geological structures, comprising:

a computer memory for storing seismic trace data corresponding to pairs of seismic traces, each trace representative of acoustic energy traveling through subsurface geological structures and detected at one of a plurality of receiver locations, each pair of traces associated with a common receiver location and including a horizontal trace corresponding to horizontally-sensed energy and a vertical trace corresponding to vertically-sensed energy;

an output device, for presenting a seismic survey to a human user;

a system computer, coupled to the computer memory and to the output device, programmed to perform, for each of a plurality of gathers of paired seismic traces, the operations of:

retrieving, from computer memory, data corresponding to a selected gather of paired seismic traces, each trace in the selected gather corresponding to a receiver located at an offset distance;

estimating, for at least a first reflection event detected in the paired seismic traces for the selected gather, a zero-offset directivity value and a directivity slope value;

determining, for each of the plurality of paired seismic traces in the selected gather, a direction angle from the zero-offset directivity value and the directivity slope value, and from the offset distance of the receiver location associated with the paired seismic traces;

generating, for each of the plurality of paired seismic traces in the selected gather, a longitudinal seismic trace based upon a combination of the horizontal and vertical seismic traces and the direction angle;

storing the longitudinal seismic traces in the computer memory; and generating a seismic survey output for display on the output device.

11. The system of claim 10, wherein the plurality of operations further comprises:

generating, for each of the plurality of paired seismic traces in the selected gather, a transverse seismic trace based upon a combination of the horizontal and vertical seismic traces and the direction angle; and storing the transverse seismic traces in the computer memory.

12. The system of claim 10, wherein the plurality of operations further comprises:

prior to the estimating step, applying normal move-out corrections to the traces in the selected gather.

13. The system of claim 10, wherein the plurality of operations further comprises:

repeating the estimating, determining, generating, and storing steps for a plurality of reflection events detected in the paired seismic traces for the selected gather.

14. The system of claim 10, wherein the estimating operation comprises:

selecting a window of interest over the plurality of paired seismic traces;

for portions of each of the paired seismic traces in the selected window of interest, and for each of a plurality of trial values of zero-offset directivity value and directivity slope, evaluating a performance function based upon a ratio of energy of estimated longitudinal seismic energy to a sum of estimated longitudinal seismic energy and transverse seismic energy;

determining the trial values of zero-offset directivity value and directivity slope for which the evaluating step returns a maximum value; and storing, in the computer memory, the values of zero-offset directivity value and directivity slope determined in the determining step, as the zero-offset directivity value and a directivity slope for the reflection event.

15. The system of claim 10, wherein the seismic traces correspond to pressure wave energy sensed at the plurality of receiver locations.

16. The system of claim 15, wherein the receiver locations correspond to seafloor locations, and wherein the seismic traces correspond to pressure wave energy sensed by ocean bottom cable sensors deployed at the seafloor locations.

* * * * *